(12) United States Patent
Schiattone

(10) Patent No.: US 6,269,212 B1
(45) Date of Patent: Jul. 31, 2001

(54) METHOD FOR PERFORMING FIXING INSIDE A CONTAINER FOR OPTICAL CONNECTION COMPONENTS

(75) Inventor: Francesco Schiattone, Novedrate (IT)

(73) Assignee: Pirelli Cavi e Sistemi S.p.A., Milan (IT)

(*) Notice: Subject to any disclaimer, the term of this patent is extended or adjusted under 35 U.S.C. 154(b) by 0 days.

(21) Appl. No.: 09/154,582

(22) Filed: Sep. 17, 1998

Related U.S. Application Data
(60) Provisional application No. 60/059,710, filed on Sep. 22, 1997.

(30) Foreign Application Priority Data
Sep. 18, 1997 (EP) .................................. 97 116 226

(51) Int. Cl.[7] .................................................. G02B 6/00
(52) U.S. Cl. ............................ 385/135; 385/136; 385/137
(58) Field of Search .................................. 385/134, 135, 385/136, 137, 138, 139

(56) References Cited

U.S. PATENT DOCUMENTS

| | | | |
|---|---|---|---|
| 4,373,776 | * 2/1983 | Purdy | 385/134 |
| 5,243,680 | 9/1993 | Soane . | |
| 5,515,200 | * 5/1996 | Delrosso et al. | 385/135 |
| 5,519,804 | 5/1996 | Burek et al. . | |
| 5,668,909 | * 9/1997 | Mozzati | 385/134 |
| 5,668,911 | * 9/1997 | Debortoli | 385/134 |
| 5,689,606 | * 11/1997 | Hassan | 385/135 |
| 5,758,002 | 5/1998 | Walters . | |
| 5,758,004 | 5/1998 | Alarcon et al. . | |
| 5,915,061 | * 6/1999 | Vanoli | 385/135 |

FOREIGN PATENT DOCUMENTS

| | | |
|---|---|---|
| 36 40 836 | 5/1988 | (DE) . |
| 0 355 639 | 2/1990 | (EP) . |
| 0 357 429 | 3/1990 | (EP) . |
| 0 496 331 | 7/1992 | (EP) . |
| 0 617 305 | 9/1994 | (EP) . |
| 0 718 929 | 6/1996 | (EP) . |
| 245732 | 1/1993 | (NZ) . |

OTHER PUBLICATIONS

K. Giyu, "Reinforcing Method of Optical Fiber Connection Part", Patent Abstracts of Japan of JP 60 142312, Jul. 27, 1985.

Y. Hiroshi, "Connector of Optical Fiber and Production Thereof", Patent Abstracts of Japan of JP 03 038604, Feb. 19, 1991.

H. Shigeru, "Packaging Structure of Optical Module", Patent Abstracts of Japan of JP 07 198 990, Aug. 1, 1995.

* cited by examiner

Primary Examiner—Frank G. Font
Assistant Examiner—Sang H. Nguyen
(74) Attorney, Agent, or Firm—Finnegan, Henderson, Farabow, Garrett & Dunner, L.L.P.

(57) ABSTRACT

Method for performing fixing inside a container for optical connection components, comprising the step of manufacturing a protective packaging from elastomeric material encapsulating at least one optical connection component, inserting said packaging containing said at least one component inside said container, and closing the container itself.

28 Claims, 6 Drawing Sheets

METHOD FOR PERFORMING FIXING INSIDE A CONTAINER FOR OPTICAL CONNECTION COMPONENTS

RELATED APPLICATIONS

This application relies on the benefit of priority of U.S. provisional patent application Ser. No. 60/059,710, filed on Sep. 22, 1997.

FIELD OF THE INVENTION

The present invention relates to the sector of packaging for optical devices and in particular relates to a method for performing fixing inside a container for optical connection components.

DESCRIPTION OF THE RELATED ART

For the purposes of the present patent application an optical connection component is understood as being a component suitable for connecting optical fibres together, for example: an optical coupler, an optical isolator, an optical divider or other passive optical devices. More generally, an optical connection component is defined as being any optical component in which there is at least one optical fibre carrying the optical signal in the component itself and at least one optical fibre emerging from it.

Passive optical networks, referred to as PONs, are networks which have arranged in them several units allowing the subdivision and distribution of a certain number of optical channels into a multiple thereof using a plurality of the said passive optical devices. The latter, inside the said units, are organized in turn inside boards, conventionally known as trays, which contain them and on which they are fixed.

The structure of the units which contain the trays or boards varies depending on the type of design, but fundamentally said units have a certain number of trays mounted on a single support.

The tray or board or container which houses the optical connection device is made, depending on the design, of plastic or metallic material and in general comprises a base, on which the said components are arranged, and a lid; the base and the lid are locked together by means of suitable closing means.

Moreover, this board may also have inside it a mechanism for wrapping or accommodating in a suitable manner the sections of excess fibre which are connected to the component inside it; in fact, the optical components may be curved only up to a certain minimum radius of curvature, otherwise signal attenuation or even damage to the fibre structure occur. Therefore, in some cases it is advisable to keep inside the said trays some sections of excess fibre which are arranged so that the signal inside the fibre is not subject to excessive attenuation or the structure of the fibre itself is not damaged, in addition to allowing the operations involving welding of the fibres themselves to be easily performed.

Among the given optical connection components, the junctions between sections of optical fibres are performed commonly using special apparatus which performs intimate bonding of the ends of the two fibres by means of butt welding, so as to minimize the signal attenuations due to the connections themselves; each welding point thus provided is encapsulated in a protective packaging. Said welding points in this way are protected and forming a type of optical connection component provided with a protective packaging. Then, said junctions are inserted into the various trays in accordance with a suitable logic for optimization of the spaces inside them.

As regards planar waveguide optical components, these are usually encapsulated in silicone rubber or in an equivalent elastomeric material so as to ensure adequate protection against both mechanical and environmental stresses. The component with the silicone packaging is then inserted into the actual package which has the function of rigidly supporting the component itself.

In both cases described above, the components inside their packages are inserted inside the trays by means of silicone bonding agents or adhesives. Then the trays are closed and fixed onto the appropriate supports of the various units inside the passive optical networks (PONs).

The Applicant has ascertained that the assembly operation for the components inside the trays is sometimes difficult, since the latter do not have large spaces inside them for insertion of these packages, the volume of which is often considerable. Moreover, in view of their rigidity, handling them is nevertheless complex during insertion. Finally, fixing them inside the tray, by means of said silicone bonding agents or adhesives, may not satisfy the requirements of reliability over time as a result of the action of external agents which could modify the characteristics thereof.

U.S. Pat. No. 4,373,776 describes a protection unit for optical components such as junctions between optical fibres and optical attenuators inside which a plurality of trays is fixed, by means of hinges, to the centre of the base of the unit itself. These trays are in the form of thin boxes and are arranged, parallel to one another, transversely on the base of the unit and have inside them the said junctions between optical fibres and optical attenuators. The sections of fibres emerging from each tray are channelled into two guides arranged longitudinally on both sides of the base of the unit.

Each tray has inside it a fastening support for the said components comprising a strip of elastomeric material which has a plurality of transverse recesses formed on its surface inside which the components themselves are inserted by means of pressure. Following insertion of the components, a closing element covers the trays in the zone occupied by the strip of material which retains the components themselves, helping further to fix them in the tray.

This strip of elastomeric material may be made by means of extrusion or by means of fusion and preferably is composed of expanded rubber.

U.S. Pat. No. 5,519,804 describes a tray inside which a device for retaining optical connection components, in particular for junctions between optical fibres, is removably inserted. This device comprises a layer of elastomeric material in which U-shaped recesses containing the said junctions are formed. The tray also has inside it a device for wrapping the sections of excess fibre emerging from the various connectors arranged in the tray.

BRIEF SUMMARY OF THE INVENTION

According to the present invention it has been found that, by manufacturing a packaging for covering an optical connection component from an elastomeric material, such as silicone rubber for example and in a shape geometrically suitable for inserting it and binding it by means of interlocking engagement into a container, it is possible to avoid using an actual rigid package for the component itself. In fact, the latter is inserted with its rubber covering inside the trays and suitably fixed inside. Assembly of the tray and the components inside it is facilitated and the packaging of elastomeric material provides the components inside it with the necessary protection from mechanical and environmental stresses.

According to a first aspect thereof, the present invention relates to a method for performing fixing inside a container for optical connection components, characterized in that it comprises the following steps:

providing a protective packaging made of elastomeric material encapsulating at least one optical connection component;

inserting said packaging containing said at least one component inside said container;

closing the container.

In particular, this step of providing a protective packaging made of elastomeric material encapsulating at least one optical connection component comprises:

inserting an optical connection component into a mould of suitable shape for subsequent positioning of said packaging in the container;

filling the mould with the material forming is the packaging in the fluid state;

cross-linking the material forming the packaging with the component inside;

extracting the packaging itself from the mould.

In particular, said step of inserting said packaging containing said at least one component inside said container comprises:

binding by means of interlocking engagement the packaging containing the component into the container;

Preferably the operation of filling the mould is performed by means of injection moulding.

In particular, said elastomeric material forming the packaging is a resin with a cross-linking temperature lower than 80° C., an operating temperature range of between −40° C. and +85° C. and a Shore hardness factor A of less than 40.

Preferably, this elastomeric material forming the packaging is a silicone resin. In particular, this material is a silicone acrylic resin cross-linking at ambient temperature.

According to a further aspect thereof, the present invention relates to a container for optical connection components, characterized in that it comprises a base into which at least one packaging made of elastomeric material and incorporating at least one optical connection component is inserted, and a lid for the container itself, means for closing the container itself and means for fixing this packaging being arranged between said base and said lid.

Preferably said packaging is further provided with at least one seat for removable insertion of an additional optical connection component.

In particular, said base has a substantially semi-circular shape and comprises a vertical rim present substantially along the entire perimeter thereof, two openings allowing the fibres to enter and leave the container in the vicinity of both the ends of the straight side in the rim, and along the rim a plurality of elements for guiding the fibres along an obligatory peripheral path inside this base.

In particular, said lid comprises a vertical rim, along its entire perimeter, matching the corresponding edge of the base.

In particular, said packaging comprises a rear portion incorporating inside it the said optical connection component, a front portion which has said at least one seat on its upper surface, and a central portion in which means for performing fixing to the container are arranged.

Preferably said incorporated component is arranged transversely in the rear portion and said at least one seat is arranged transversely over the entire width of the packaging itself in the front portion and on the upper surface.

In particular, said at least one seat comprises a recess with a rounded and widened bottom for comfortably housing the component, said recess having a narrow upper part for insertion with pressure and securely fixing the component itself inside.

Preferably said fixing means are fixing means of the interlocking type.

Preferably, said means for closing the container itself and said fixing means for this packaging comprise in the central zone of the base itself a pedestal of substantially rectangular shape for resting the packaging on the base itself and two vertical cylindrical pins which are centrally holed and arranged alongside one another on this pedestal, on the bottom surface of the lid a locating element for the upper surface of the packaging with a shape and dimensions corresponding to those of the pedestal and two holes aligned in a position corresponding to that of the pins, and on the packaging in the central portion two aligned through-holes arranged opposite the pins present on the base.

Alternatively, said means for closing the container itself and said means for fixing this packaging comprise in the central zone of the base a lug with a substantially rectangular shape and short sides which are rounded and two vertical cylindrical pins which are centrally holed and arranged alongside one another on the sides of the lug, on the bottom surface of the lid an abutting element with shape and dimensions corresponding to those of the lug and two holes aligned in a position corresponding to that of the pins, on the packaging in the central portion a through-opening with shape and dimensions equivalent to those of the lug on the base, and two vertical aligned recesses located opposite each other on the sides of the packaging and arranged opposite the pins present on the base.

Preferably, this component incorporated in the rear part of the packaging is a planar optics splitter and the component removably inserted in the seats is an optical junction or a fused-fibre coupler or optical attenuator.

According to a further aspect thereof, the present invention relates to a device for performing fixing to a container and for protection of optical connection components, characterized in that it has a packaging made of elastomeric material and comprising at least one optical connection component incorporated inside it and means for performing fixing to said container.

Preferably, said packaging further comprises at least one seat for removable insertion of an optical connection component.

In particular, said packaging comprises a rear portion incorporating inside it the said optical connection component, a front portion which has said at least one seat on its upper surface, and a central portion in which said means for performing fixing to a container are arranged.

Preferably said means for performing fixing to a container are fixing means of the interlocking type.

In particular, said incorporated component is arranged transversely in the rear portion and said at least one seat is arranged transversely over the entire width of the packaging itself in the front portion and on the upper surface.

In particular, said at least one seat comprises a recess with a rounded and widened bottom for comfortably housing the component, said recess having a narrow upper part for inserting with pressure and securely fixing the component itself inside.

Preferably, this component incorporated in the rear part of the packaging is a planar optics divider and the component removably inserted in the seats is an optical junction or a fused-fibre coupler or optical attenuator.

BRIEF DESCRIPTION OF THE DRAWINGS

The present invention will be described below, by way of example, with reference to the accompanying figures in which.

DETAILED DESCRIPTION OF THE INVENTION

It should be noted that the number and the type of components shown inside the tray must not be regarded as a limit for a specific configuration; for the purposes of the invention the particular combination described and realized with the given number of components is substantially uninfluential. In fact, any further combination may be realized using the same teachings of the present invention.

Furthermore, the accompanying figures illustrate two embodiments of the container for optical connection components, referred to above as a tray, and the protective device obtained with the method forming the subject of the present invention; these embodiments are examples but are not limiting in that the method is equally applicable to other types and forms of containers.

With reference to FIGS. 1 to 4, this embodiment of the container is made of plastic or metallic material. In particular, it comprises a base 2 on which the components are arranged inside the packaging 4, and a lid 3 of corresponding shape. Both the base and the lid may have a perimetral rim so as to form a box-like element inside which said packaging 4 is inserted. Means for closing the container itself are provided between said base and said lid.

Figure 1:
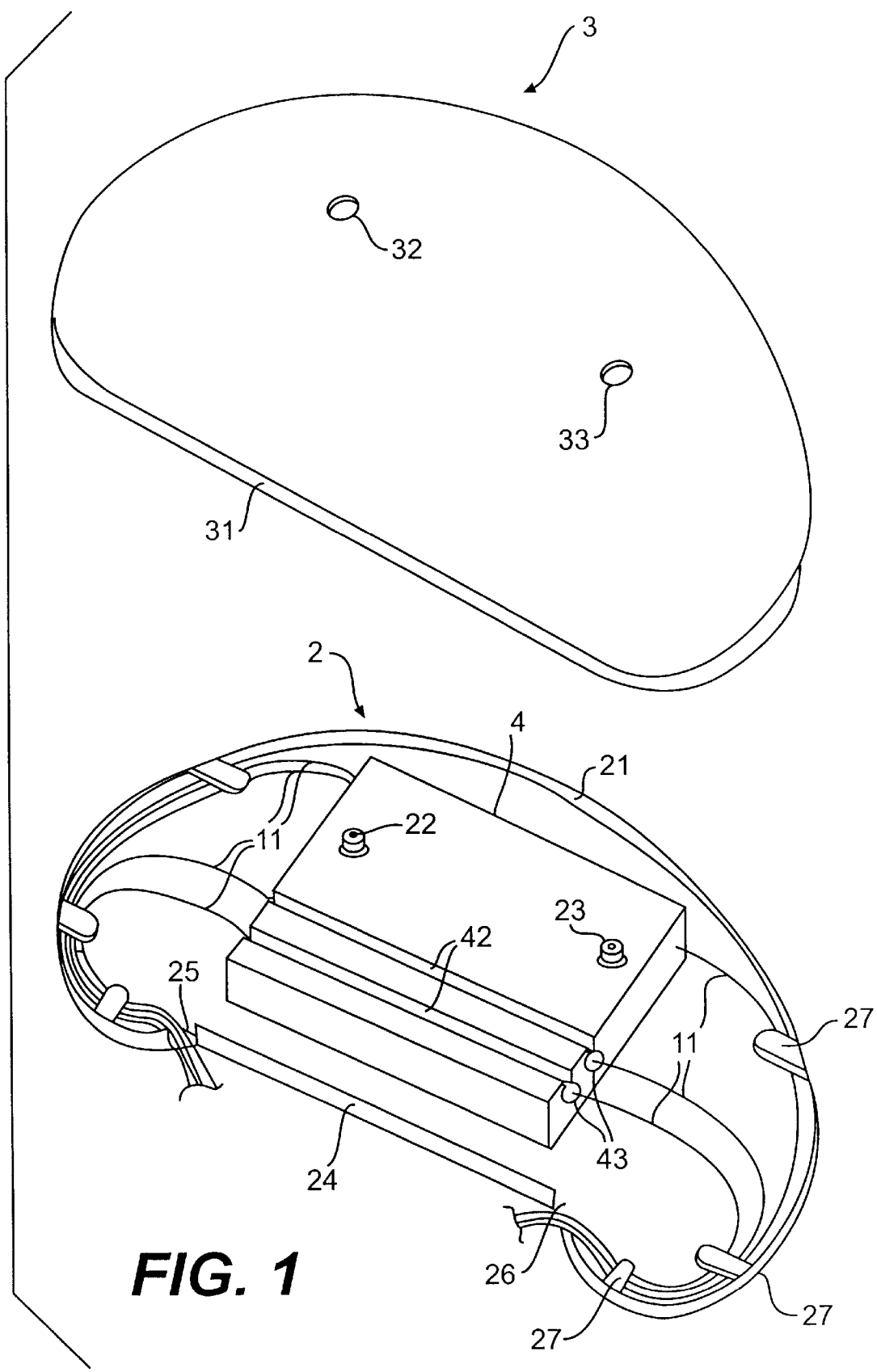
FIG. 1 shows a perspective top view of the container for optical connection components with inside it the packaging containing these components, in accordance with an embodiment according to the present invention.
Figure 2:
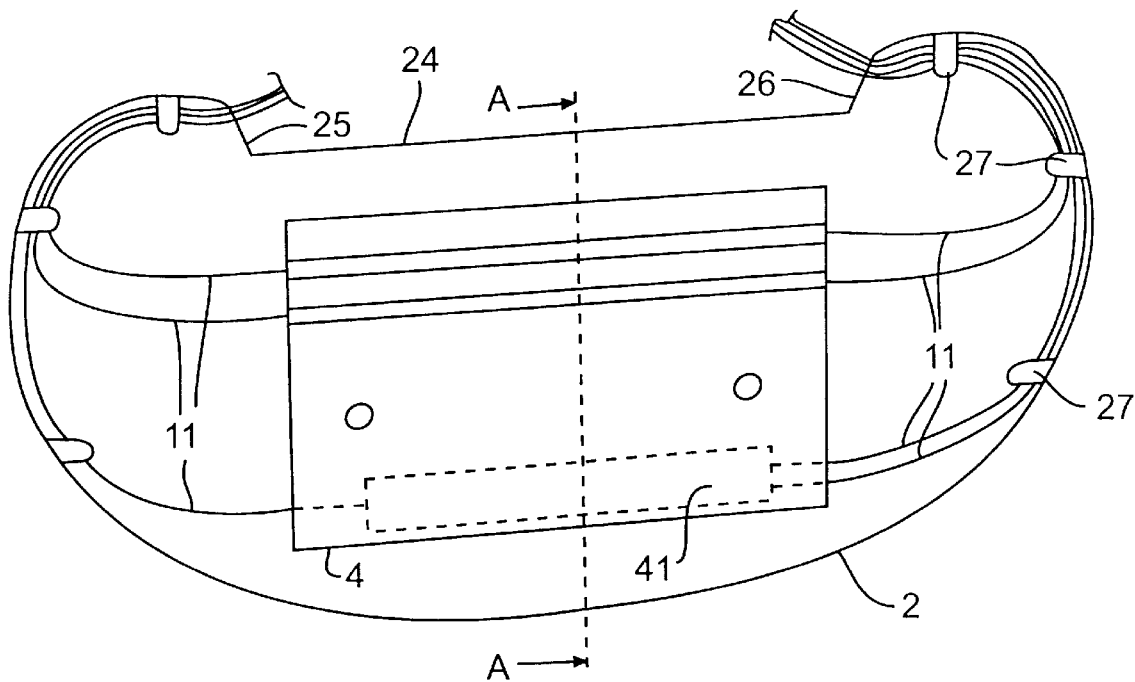
FIG. 2 shows a top view of the container according to FIG. 1, without the lid.
Figure 3:
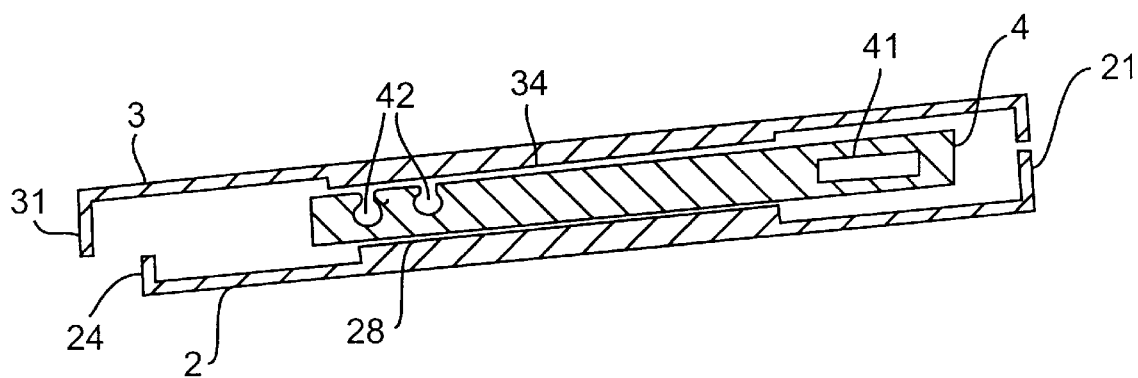
FIG. 3 shows a cross-sectional view of the same container according to FIG. 2, along the plane indicated by A—A in the same figure.

FIGS. 1, 2 and 3, in particular, show an example of embodiment of the said base 2, which has a substantially semi-circular shape, comprising a vertical rim 21 present substantially along the entire perimeter thereof and two vertical cylindrical pins 22 and 23 which are axially holed and arranged alongside one another in the central zone of the base itself. In the vicinity of both the ends of the straight side 24 of the semi-circumference there is a short section where the vertical rim 21 is interrupted, so as to form two openings 25 and 26 allowing the fibres 11 to enter and leave the container.

Elements 27 for guiding the fibres 11 along an obligatory peripheral path inside the tray are arranged along the rim 21 of the base. These elements are illustrated by way of example in the form of tongues which extend from the rim 21. In the central zone of the base there is a pedestal 28 of substantially rectangular shape for supporting on the base a packaging 4 containing the optical connection components.

The lid 3 comprises a vertical rim 31, along its entire perimeter, matching the corresponding rim 21 of the base 2, two holes 32 and 33 aligned in a position corresponding to that of the pins 22 and 23 of the base 2 and a locating element 34 arranged on its bottom surface, with a shape and dimensions corresponding to those of the pedestal 28 of the base 2.

The aforementioned means for closing the containers comprising, by way of example, screws, pressure pins or equivalent closing elements which are inserted between the lid 3 and the base 2. Moreover, these closing means may be arranged along the edge of the container and be in the form of clips for fastening the base 2 and the lid 3, or elements for interlocking the two rims 21 and 31 of this base and this lid, or adhesive element and similar element.

Figure 4:
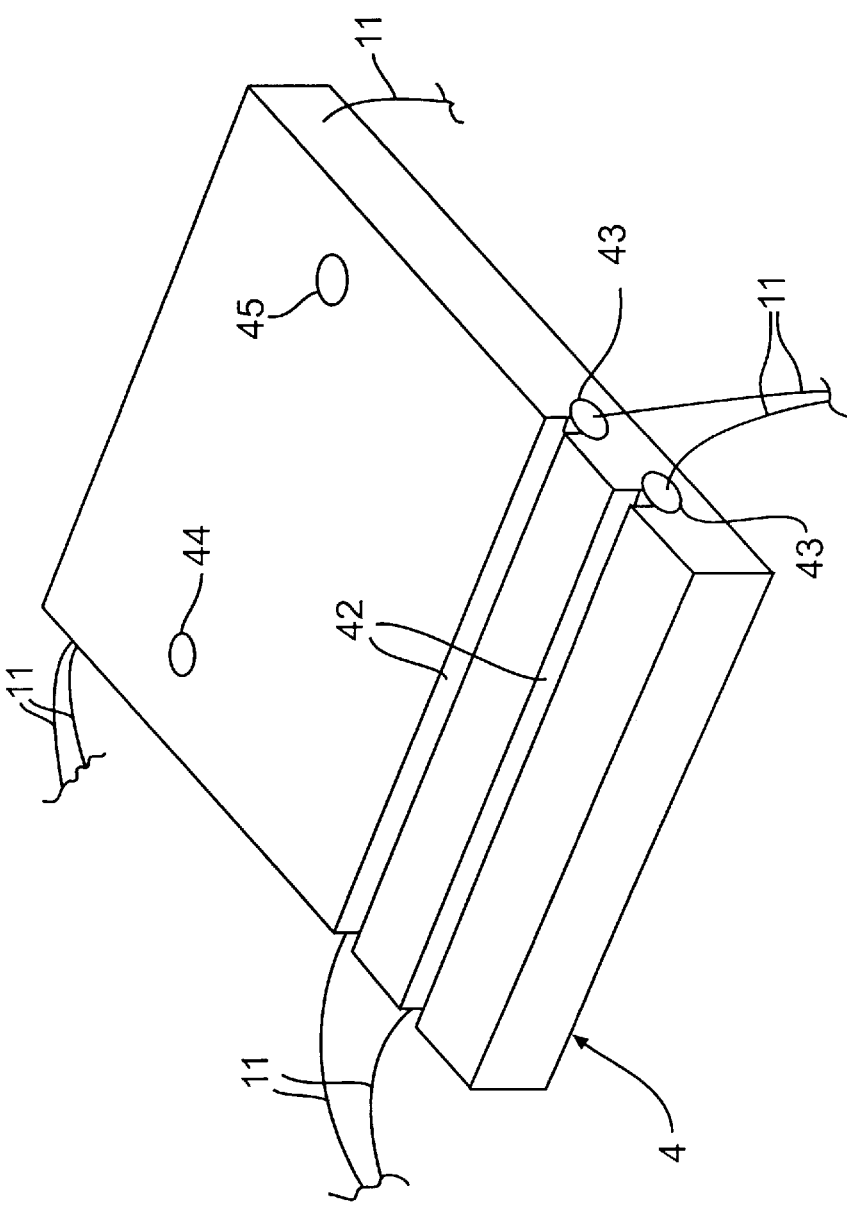
FIG. 4 shows a perspective top view of the protective packaging illustrated in FIG. 1.

FIG. 4 shows in detail the packaging 4, made of elastomeric material and incorporating inside it at least one optical connection component 41. It has a substantially parallelepiped shape, divided up into three portions: a rear portion, incorporating inside it said optical connection component 41, a optional front portion comprising by way of example on its upper surface two seats 42 for removable insertion in each of them of an additional component 43 and a central portion in which the means for fixing to the container are arranged.

These fixing means may be of the chemical type, for example glues or adhesives which are arranged on the surface of the packaging 4 and secure the latter between the lid 3 and the base 2; they may be of the mechanical type, for example screws, pins or equivalent means which are inserted in the packaging and secure it between the base and the lid themselves, or else clips, bands or seals which fix the packaging on the base or the lid. Moreover, layers of velcro arranged between the packaging and the base or the lid may be used.

Preferably, however, these fixing means are fixing means of the interlocking type, i.e. the packaging has a shape which allows it to be inserted with interlocking engagement into the container. In particular, in said embodiment, these means comprise on the packaging two aligned through-holes 44 and 45 arranged opposite the pins 22 and 23 present on the base.

The rear portion containing the component 41 is slightly raised from the base 2 in view of the presence is of the pedestal 28, so as to allow any thermal expansion of the packaging in the zone in which the eventually mechanical stresses from said thermal expansion may produce attenuations of the optical signals or damages to the component incorporated inside it.

Said seats 42 are arranged, parallel to one another, transversely over the entire width of the packaging. Preferably they comprise a recess with a rounded and widened bottom for comfortably housing the component; the narrow upper part of the recess allows the component itself to be fixed securely.

With reference to FIGS. 5 to 8, this embodiment of the container is made of plastic or metallic material. In particular, it comprises a base 2' on which the components inside the packaging 4' are arranged, and a lid 3' of corresponding shape. Both the base and the lid may have a perimetral rim so as to form a box-like element inside which said packaging 4' is inserted. Means for closing the container itself are present between said base and said lid.

Figure 5:
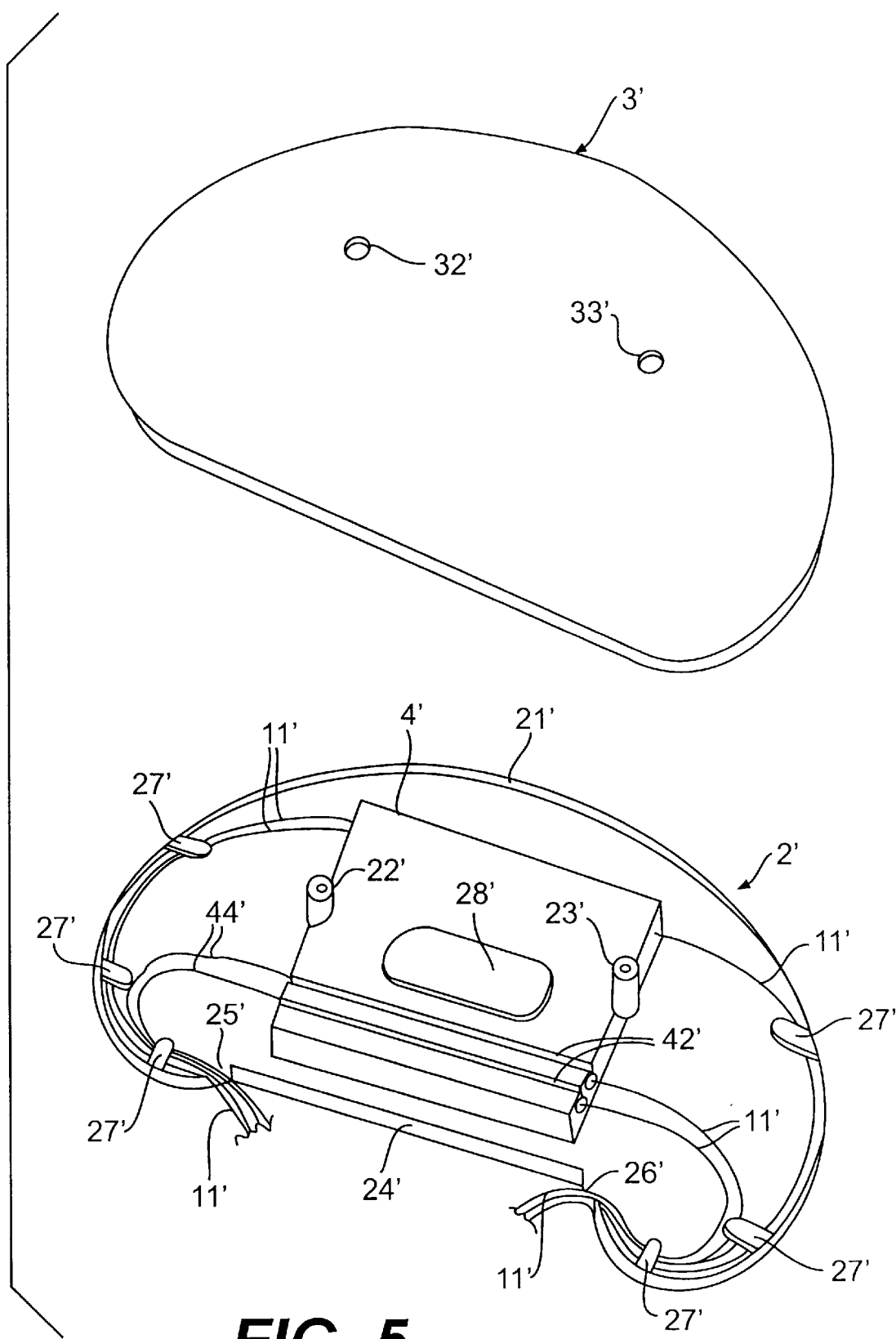
FIG. 5 shows a perspective top view of the container for optical connection components with inside it the packaging containing these components, in accordance with a further embodiment according to the present invention.
Figure 6:
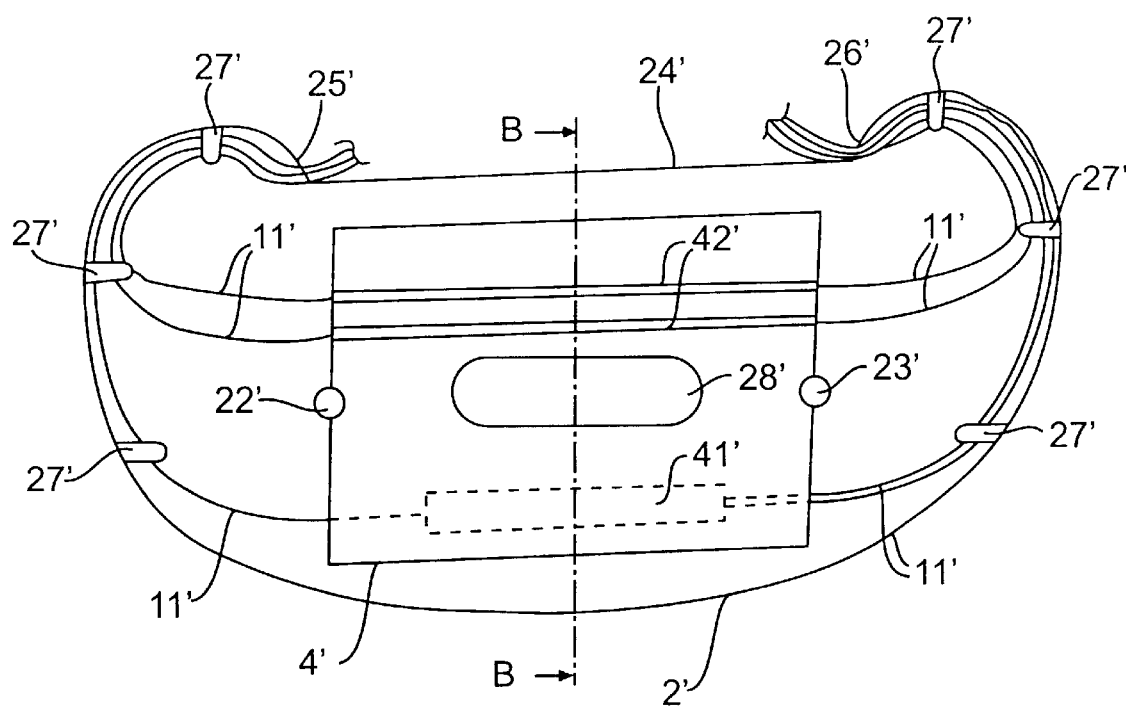
FIG. 6 shows a top view of the container according to FIG. 5, without the lid.
Figure 7:
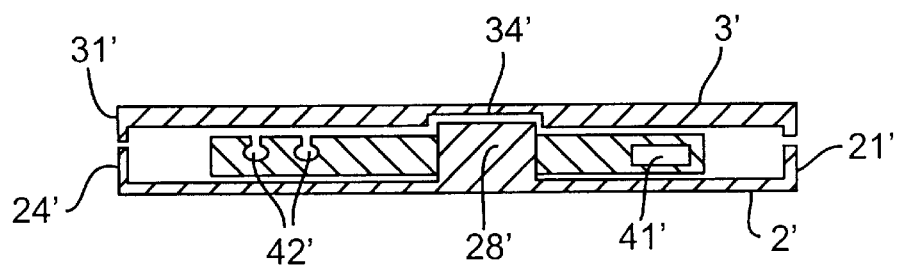
FIG. 7 shows a cross-sectional view of the same container according to FIG. 6, along the plane indicated by B—B in the same figure.

FIGS. 5, 6 and 7 show, in particular, an embodiment of the said base 2' comprising a vertical rim 21' present substantially along the entire perimeter thereof, two vertical cylindrical pins 22' and 23' which are centrally holed and arranged alongside one another in the central zone of the base itself. In the vicinity of both ends of the straight side 24' of the semi-circumference there is a short section where the vertical rim 21' is interrupted so as to form two openings 25' and 26' allowing the fibres 11 to enter and leave the container.

Elements 27' for guiding the fibres 11' along an obligatory peripheral path inside the tray are arranged along the rim 21' of the base. These elements are illustrated by way of example in the form of tongues which extend from the rim 21' and are three in number for each side in question. The central zone of the base has a lug 28' of substantially rectangular shape and with the short sides rounded, for inserting with interlocking engagement a packaging 4' containing the optical connection components onto the base.

The lid 3' comprises a vertical rim 31', along its entire perimeter, matching the corresponding rim 21' of the base 2', two aligned holes 32' and 33' in a position corresponding to that of the pins 22' and 23' of the base 2' and a locating element 34' arranged on its bottom surface, with shape and dimensions corresponding to those of the plate 28' of the base 2'.

Figure 8:
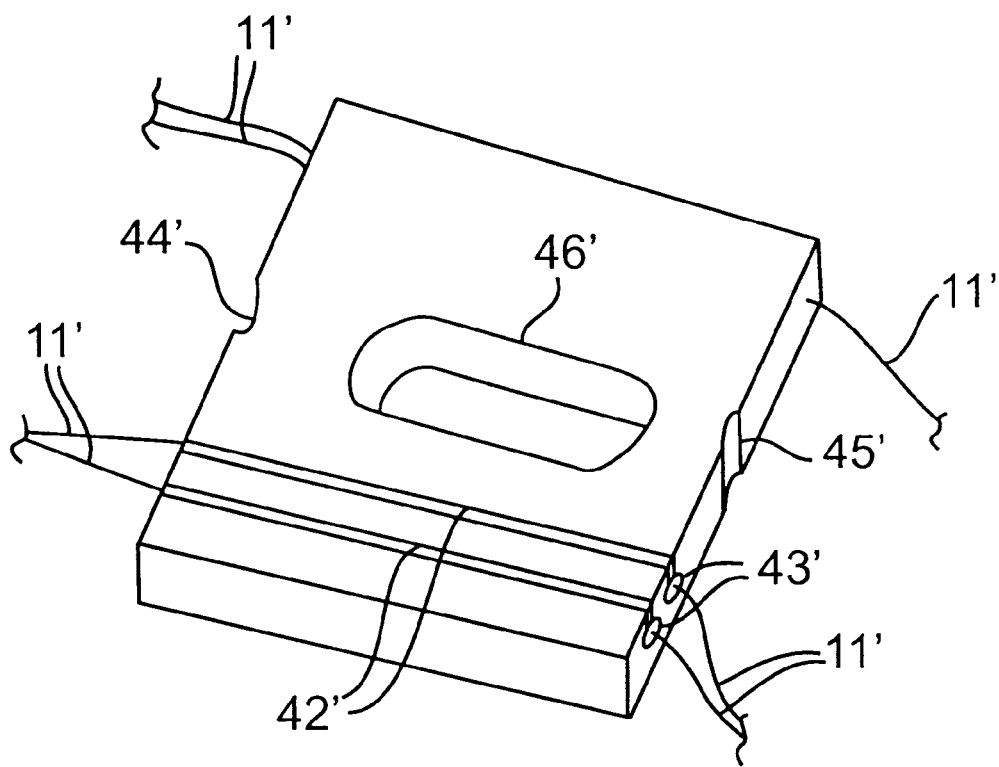
FIG. 8 shows a perspective top view of the protective packaging illustrated in FIG. 5.

FIG. 8 shows in detail the packaging 4' made of elastomeric material and incorporating inside it at least one optical connection component 41'. It has a substantially parallelepiped shape and is divided up into three portions: a rear portion, incorporating inside it an optical connection component 41'; a front portion comprising by way of example on its upper surface two seats 42' for removable insertion of an additional component 43' in each of them; and a central portion in which the means for performing fixing to the container are arranged.

These fixing means may be of the chemical type, for example glues or adhesives which are arranged on the packaging 4' and which secure the latter between the lid 3' and the base 2'; they may be of the mechanical type, for example screws, pins or equivalent means which are inserted in the central portion of the packaging and secure the latter between the base and the lid themselves, or else clips, bands or seals which fix the packaging on the base or on the lid. Moreover, layers of Velcro arranged between the packaging and the base or lid may be used.

Preferably, however, said fixing means are fixing means of the interlocking type, i.e. the packaging has a shape which allows it to be inserted with interlocking engagement into the container. In particular, in this embodiment said means by way of example comprise on the packaging a through-opening 46' with a shape and dimensions equivalent to the lug 28' of the base 2', two vertical aligned recesses 44' and 45' facing each other on the sides of the packaging and arranged opposite the pins 22' and 23' present on the base.

Advantageously, this rear portion of the packaging has a thickness slightly smaller than the remainder of the packaging so as to form an empty space between the packaging and the base 2' in the zone where the component 41' is incorporated and therefore, in a similar manner to the first embodiment, any thermal expansion of the packaging in the sensitive zone of the component incorporated therein is permitted.

Said seats 42' are arranged, parallel to one another, transversely over the entire width of the packaging. Preferably they comprise a recess with a rounded and widened base for comfortably housing the component; the narrow upper part of the recess allows the component itself to be securely fixed.

From the above description of the structural characteristics of the elements which make up the present invention, the steps, described hereinbelow, of the method for fixing optical connection components inside containers are highlighted.

The initial step of manufacturing a protective packaging 4 or 4' from an elastomeric material incorporating an optical connection component 41 or 41' of the type indicated above consists basically in a moulding method. This method is typically performed by means of injection moulding, i.e. introduction of a material in the pressurized fluid state into the mould inside which the component to be encapsulated has been previously inserted. Similarly this moulding operation may be performed by means of casting, i.e. the material to be introduced into the mould is not pushed by pressure means, but is introduced by means of simple gravity or pouring.

This is followed by the step consisting in cross-linking of the material with consequent rigidification of the packaging with the component inside. This step is generally performed at ambient temperature, in view of the characteristics, indicated in detail below, of the materials used. Therefore, extraction of the packaging from the mould allows the actual protection device for the optical connection component to be obtained. This component is no longer extracted from the packaging which is its proper protective packaging. These components are advantageously planar waveguide splitters or dividers or fused-fibre couplers.

This packaging, moreover, may have formed on it the above-described seats 42 or 42' for removable insertion of additional optical components 43 or 43', which may be inserted into or extracted from the container subsequently. These components may be advantageously optical junctions or optical attenuators which are placed in PON networks also in a step following the step of embedding the component in the packaging.

Subsequently the tray is assembled so as to contain the packaging inside it. For this purpose the means for closing the container itself and the fixing means for this packaging cooperate with each other for complete assembly of the tray.

In fact, in the embodiment illustrated in FIGS. 1 to 4, the packaging 4 is inserted into the base 2 of the container in a stable manner by inserting the pins 22 and 23 arranged on the base itself into the holes 44 and 45 present in the packaging. The fibres 11, which are joined to the components embedded in the packaging 41 and to those 43 inserted with interlocking engagement into their seats 42, are arranged perimetrally on the base of the container and, in this position, retained by the tongues 27 being kept curved by an amount which is within the permitted limits, otherwise the signal inside them would be lost or the fibre itself would deteriorate. Moreover, by placing the lid 3 on the base 2 and fixing it via the said means described, the packaging 4 is further secured inside by pressure.

In the embodiment illustrated in FIGS. 5 to 8, the packaging 4' is inserted in the base 2' of the container stably by inserting the lug 28' into the opening 46' present in the packaging. The two vertical aligned recesses 44' and 45' receive the pins 22' and 23', helping to fix the packaging stably. The fibres 11' are arranged perimetrally in the base 2' as in the previous embodiment and, moreover, by placing the lid 3' on the base 2' and fixing it thereon via the said means described, the packaging 4' is further secured inside by pressure.

The elastomeric material forming the packaging is a resin which is sufficiently elastic to allow the packaging to dampen the mechanical stresses which could influence the component inside it. Similarly the characteristics of the resin must effectively protect the component from sudden changes in temperature and from moisture. Moreover, moulding of the packaging is performed with the resin itself in the fluid state and therefore it is necessary that the resin should have a fluidity index sufficient to enable this operation to be easily performed.

Substantially the preferred characteristics which this elastomeric material must be able to satisfy are listed below:

cross-linking temperature lower than 80° C.;

effective operating temperature range from −40° C. to +85° C.;

Shore hardness factor A less than 40.

A material which is suitable for this purpose and which satisfies these characteristics is a silicone resin which cross-links at ambient temperature, and in particular the Applicant has verified the use of a silicone acrylic resin called Silastic S RTV™ (Dow Corning).

From the above structural and functional description of the present invention emerge in particular the packaging for covering the optical connection components, made of silicone rubber, or more generally made of one of the materials satisfying the aforementioned characteristics, has a shape geometrically suitable for insertion by means of interlocking engagement into a container: this makes it possible to avoid the use of an actual rigid package for the component itself, as is conventionally the case, and the material allows the protection of the components against both mechanical stresses and environmental stresses.

Moreover, a further advantage is that of providing on the body of this packaging the seats able to house optical connection components of an extractable nature, such as junctions between optical fibres or optical signal attenuators; therefore more complete use is made of the container during different PON installation stages.

What is claimed is:

1. A method for performing fixing inside a container for optical connection components, comprising the steps of:

manufacturing a protective packaging from an elastomeric material encapsulating at least one optical connection component, the manufacturing including inserting an optical connection component into a mould of suitable shape for subsequent positioning of said packaging in the container, filling the mould with a packaging material in a fluid state, cross-linking the packaging material with the optical connection component inside, and extracting said protective packaging from the mould;

inserting said packaging containing said at least one optical connection component inside said container; and closing the container.

2. The method according to claim 1, wherein the step of inserting an optical connection component comprises:

binding, by interlocking engagement, the packaging containing the optical connection component into the container.

3. The method according to claim 1, wherein the step of filling the mould is performed by injection moulding of the packaging material in the fluid state.

4. The method according to claim 1, wherein the step of filling the mould is performed by casting the packaging material in the fluid state.

5. The method according to claim 1, wherein said elastomeric material forming said packaging is a resin having at least one of a cross-linking temperature of lower than 80° C., an operating temperature range of between −40° C. and +85° C., and a Shore hardness factor A of less than 40.

6. The method according to claim 1, wherein said elastomeric material forming the packaging is a silicone resin cross-linking at ambient temperature.

7. The method according to claim 1, wherein said elastomeric material forming the packaging is a silicone acrylic resin cross-linking at ambient temperature.

8. A container for optical connection components, comprising:

a base having a packaging and an optical connection component, the packaging being made of elastomeric material and having at least one seat to removably insert an additional optical connection component;

a lid for the container;

means for closing the container; and means for fixing the packaging arranged between said base and said lid.

9. The container according to claim 8, wherein said fixing means are of an interlocking type.

10. The container according to claim 8, wherein said base has a substantially semi-circular shape including a straight side and comprises a vertical rim substantially along the entire perimeter thereof, two openings allowing a plurality of fibers to enter and leave the container in the vicinity of both ends of the straight side in the rim, and a plurality of elements along the rim for guiding the fibers along an obligatory peripheral path inside each element.

11. The container according to claim 10, wherein said lid comprises a vertical rim, along an entire perimeter thereof, matching the corresponding rim of the base.

12. The container according to claim 8, wherein said packaging comprises:

a rear portion incorporating therein said optical connection component;

a front portion having said at least one seat on an upper surface thereof; and a central portion in which means for fixing the packaging to the container are arranged.

13. The container according to claim 12, wherein said incorporated optical connection component is arranged transversely in the rear portion, and said at least one seat is arranged transversely over an entire width of the packaging in the front portion and on the upper surface.

14. The container according to claim 13, wherein said at least one seat comprises a recess with a rounded and widened bottom for comfortably housing at least one additional component, said recess having a narrow upper part for inserting with pressure and securely fixing the at least one additional component therein.

15. The container according to claim 14 wherein the optical connection component incorporated in the rear part of the packaging is a planar optics divider and the at least one additional component removably inserted in the seats is an optical junction or a fused-fiber coupler or an optical attenuator.

16. The container according to claim 8, wherein said means for closing the container and said fixing means for the packaging comprise:

a pedestal in a central zone of the base, the pedestal having a substantially rectangular shape for resting the packaging on the base;

two vertical cylindrical pins which are centrally holed and arranged alongside one another on the pedestal;

a locating element positioned on a bottom surface of the lid for locating the upper surface of the packaging with a shape and dimensions corresponding to those of the pedestal and two holes aligned in a position corresponding to that of the pins; and two aligned through-holes arranged on the packaging in a central portion opposite the pins on the base.

17. The container according to claim 8, wherein said means for closing the container and said means for fixing the packaging comprise:

a lug in the central zone of the base, the lug having a substantially rectangular shape with short sides thereof rounded;

two vertical, centrally holed, cylindrical pins arranged alongside one another on the sides of the lug;

a locating element on the bottom surface of the lid having a shape and dimensions corresponding to those of the lug and two holes aligned in a position corresponding to that of the pins;

a through-opening on the packaging in the central portion, the through-opening having a shape and dimensions equivalent to those of the lug on the base; and two vertical aligned recesses located opposite each other on the sides of the packaging and arranged opposite the pins on the base.

18. A device for fixing to a container and for protection of optical connection components, comprising:

a packaging made of elastomeric material, the packaging comprising:
   at least one seat for removable insertion of an optical protection component;
   a rear portion incorporating inside optical connection component;
   a front portion having at least one seat on its upper surface; and
   a central portion;

at least one optical connection component incorporated therein; and means for fixing the packaging to said container arranged in the central portion of the packaging.

19. The device according to claim 18, wherein said means for fixing to a container are of an interlocking type.

20. The device according to claim 18, wherein said incorporated optical connection component is arranged transversely in the rear portion and said at least one seat is arranged transversely over the entire width of the packaging in the front portion and on the upper surface.

21. The device according to claim 20, wherein the optical connection component incorporated in the rear part of the packaging is a planar optics splitter and the at least one optical protection component removably inserted in the seats is one of an optical junction, a fused-fiber coupler, and an optical attenuator.

22. The device according to claim wherein said at least one seat comprises a recess with a rounded and widened bottom for comfortably housing the at least one optical protection component, said recess having a narrow upper part for inserting with pressure and securely fixing the component therein.

23. A method for manufacturing a protective packaging to affix a plurality of fibers inside a container for optical connection components, comprising:

inserting at least one of the optical connection components into a mould having a shape of the protective packaging;

filling the mould with a packaging material in a fluid state, which is made of elastomeric material;

cross-linking the packaging material with the at least one optical connection component to make the protective packaging; and extracting the protective packaging from the mould.

24. The method of claim 23, wherein the inserting step comprises binding the protective packaging by creating an interlocking engagement.

25. The method of claim 23, wherein the filling step comprises one of an injection moulding process and a casting process.

26. The method of claim 23, wherein the elastomeric material is a resin having at least one of a cross-linking temperature of lower than 80° C., an operating temperature range of between −40° C. and +85° C., and a Shore hardness factor A of less than 40.

27. The method of claim 23, wherein the elastomeric material is one of a silicone resin cross-linking at ambient temperature and a silicone acrylic resin cross-linking at ambient temperature.

28. A container for optical connection components, comprising:

a base having a packaging and an optical connection component, the packaging being made of elastomeric material and having at least one seat to removably insert at least one optical connection component, the base having a plurality of first fixing elements to affix the packaging; and a lid having a configuration corresponding to the base and a corresponding plurality of second fixing elements to interlock with the plurality of first fixing elements.

* * * * *